US008960604B1

(12) United States Patent  
Dan-Jumbo

(10) Patent No.: US 8,960,604 B1
(45) Date of Patent: Feb. 24, 2015

(54) COMPOSITE FUSELAGE SYSTEM WITH COMPOSITE FUSELAGE SECTIONS

(75) Inventor: Eugene A. Dan-Jumbo, Bothell, WA (US)

(73) Assignee: The Boeing Company, Chicago, IL (US)

( * ) Notice: Subject to any disclaimer, the term of this patent is extended or adjusted under 35 U.S.C. 154(b) by 589 days.

(21) Appl. No.: 13/226,971

(22) Filed: Sep. 7, 2011

(51) Int. Cl.
 *B64C 1/00* (2006.01)
 *B64C 1/06* (2006.01)

(52) U.S. Cl.
 CPC .......... *B64C 1/069* (2013.01); *B64C 2001/0072* (2013.01)
 USPC ........................................................ 244/120

(58) Field of Classification Search
 USPC ........ 244/119, 120, 131, 17.27, 117 R, 123.1
 See application file for complete search history.

(56) References Cited

U.S. PATENT DOCUMENTS

| 4,715,560 | A | * | 12/1987 | Loyek ....................... 244/117 R |
| 5,866,272 | A | * | 2/1999 | Westre et al. ................. 428/593 |
| 6,158,690 | A | * | 12/2000 | Wadey et al. ............... 244/17.27 |
| 2010/0227105 | A1 | | 9/2010 | Dan-Jumbo et al. |
| 2010/0227106 | A1 | | 9/2010 | Dan-Jumbo et al. |
| 2010/0227117 | A1 | | 9/2010 | Dan-Jumbo et al. |
| 2012/0025023 | A1 | * | 2/2012 | Bernard et al. ............... 244/131 |
| 2013/0011586 | A1 | * | 1/2013 | Landry et al. ................ 428/34.1 |
| 2013/0040008 | A1 | * | 2/2013 | Chapman et al. ............. 425/110 |
| 2014/0117157 | A1 | * | 5/2014 | Diep et al. .................... 244/120 |
| 2014/0145031 | A1 | * | 5/2014 | Moselage, III ............... 244/119 |

OTHER PUBLICATIONS

U.S. Appl. No. 12/903,489, filed Oct. 13, 2010, Dan-Jumbo.

* cited by examiner

*Primary Examiner* — Valentina Xavier
(74) *Attorney, Agent, or Firm* — Yee & Associates, P.C.

(57) ABSTRACT

A method and apparatus comprising a composite section. The composite section has a cylindrical shape. The composite section also has an outer wall configured to be bonded to a first inner wall of a first composite cylindrical fuselage section and a second inner wall of a second composite cylindrical fuselage section for an aircraft.

13 Claims, 11 Drawing Sheets

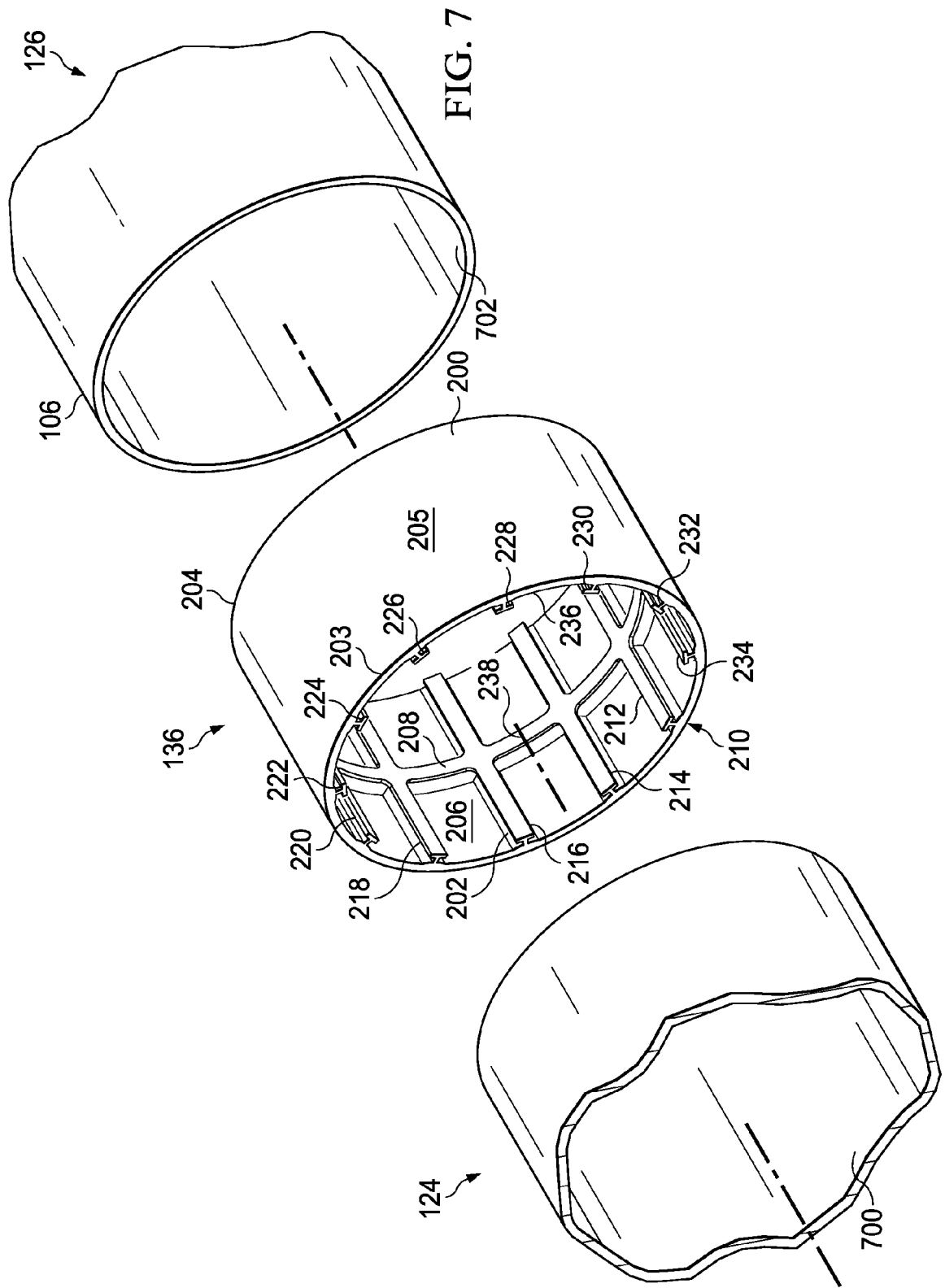

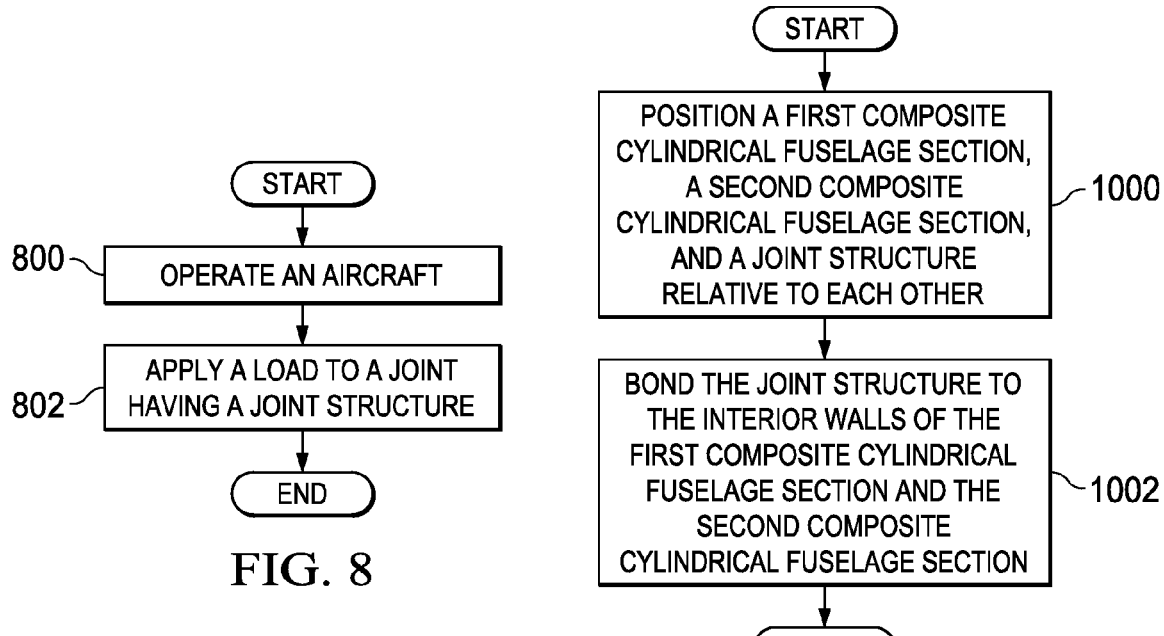
FIG. 8
FIG. 10
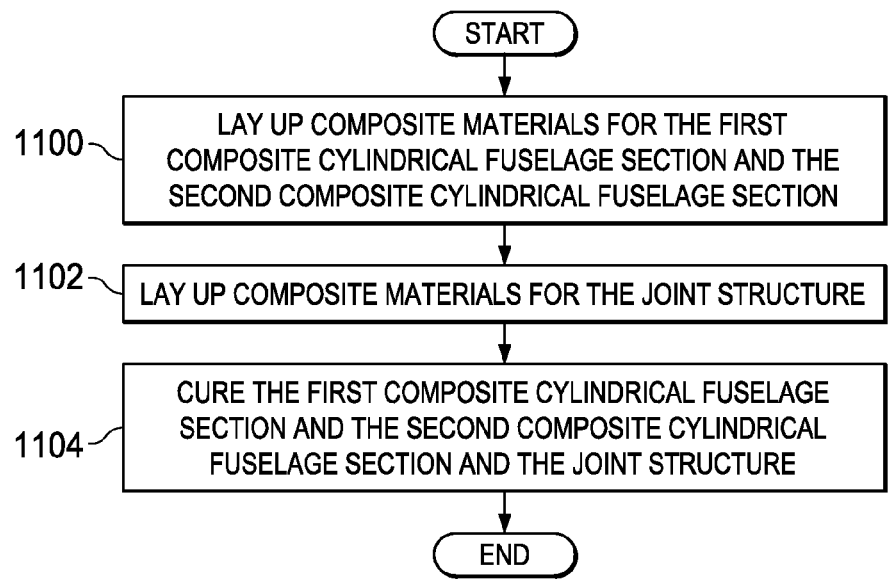
FIG. 11

FIG. 13
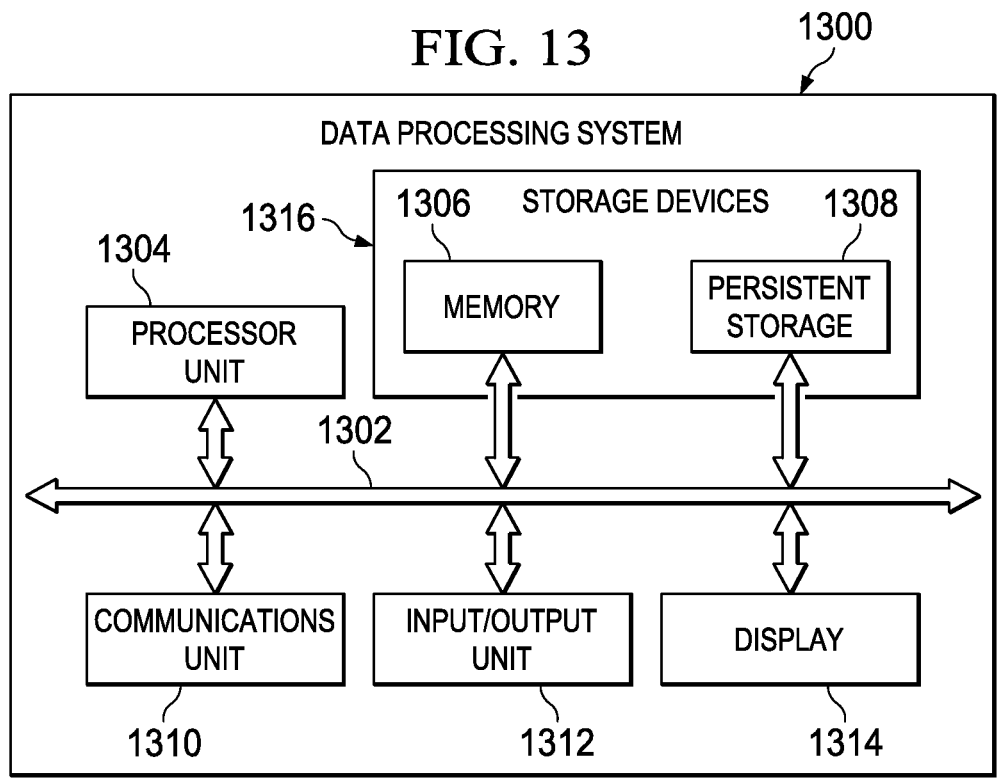
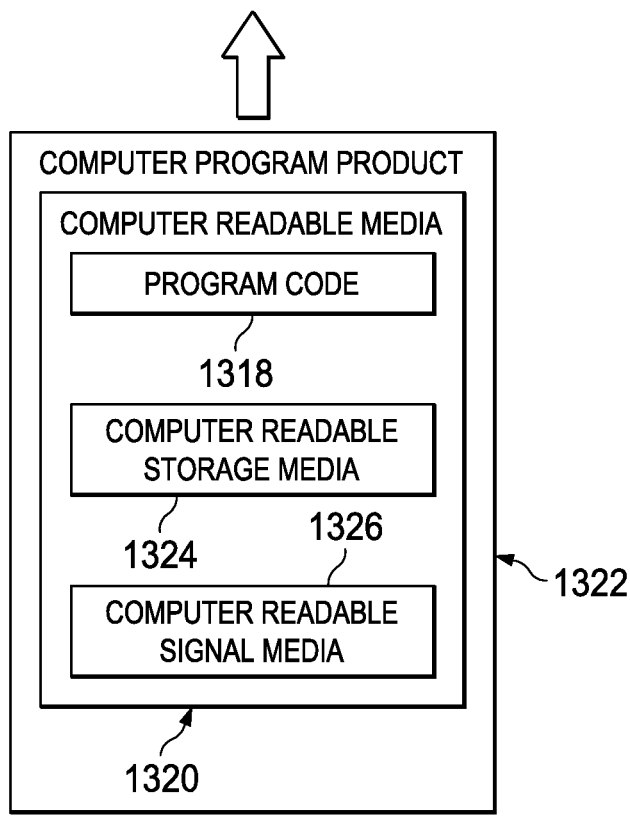

COMPOSITE FUSELAGE SYSTEM WITH COMPOSITE FUSELAGE SECTIONS

BACKGROUND INFORMATION

1. Field

The present disclosure relates generally to aircraft and, in particular, to aircraft comprised of composite materials. Still more particularly, the present disclosure relates to a method and apparatus for a fuselage of a composite aircraft having bonded joints.

2. Background

Aircraft are being designed and manufactured with greater and greater percentages of composite materials. Some aircraft may have more than 50 percent of their primary structure made from composite materials. Composite materials are used in aircraft to decrease the weight of the aircraft. This decreased weight improves performance features, such as payload capacities and fuel efficiencies. Further, composite materials provide longer service life for various components in an aircraft.

Composite materials are tough, light-weight materials created by combining two or more components. For example, a composite material may include fibers and resins. The fibers may be in the form of a substrate or a matrix. For example, the fibers may take the form of a woven cloth. The resin may form a reinforcement for the substrate. The fibers and resins are combined and cured to form a composite material.

Further, by using composite materials, portions of an aircraft may be created in larger pieces or sections. For example, a fuselage in an aircraft may be created in cylindrical fuselage sections that may be put together to form the fuselage of the aircraft. Other examples include, for example, without limitation, wing sections joined to form a wing or stabilizer sections joined to form a stabilizer.

With respect to the fuselage of an aircraft, the different cylindrical sections are joined to each other at locations called "joints". A "joint" is a location at which two cylindrical fuselage sections may be joined to each other.

Joining these sections of the fuselage to each other may be performed using metallic fasteners. These metallic fasteners may increase the weight of the fuselage more than desired even though the use of composite materials for the fuselage sections reduces the amount of weight for the aircraft. This weight may result in reduced fuel efficiency and a cost of operating the aircraft that is more than desired.

Therefore, it would be advantageous to have a method and apparatus that takes into account at least some of the issues discussed above, as well as possibly other issues.

SUMMARY

In one advantageous embodiment, an apparatus comprises a composite section. The composite section has a cylindrical shape. The composite section also has an outer wall configured to be bonded to a first inner wall of a first composite cylindrical fuselage section and a second inner wall of a second composite cylindrical fuselage section for an aircraft.

In another advantageous embodiment, an aircraft comprises a plurality of composite cylindrical fuselage sections. A first composite cylindrical fuselage section in the plurality of composite cylindrical fuselage sections has a number of different properties from a second composite cylindrical fuselage section in the plurality of composite cylindrical fuselage sections.

In yet another advantageous embodiment, a method for applying a load to an aircraft is provided. An aircraft having a plurality of composite cylindrical fuselage sections and a number of joint structures bonded to the plurality of composite cylindrical fuselage sections to connect the plurality of composite cylindrical fuselage sections to each other is operated. A joint structure in the number of joint structures comprises a composite section. The composite section has a cylindrical shape and an outer wall configured to be bonded to a first inner wall of a first composite cylindrical fuselage section in the plurality of composite cylindrical fuselage sections and a second inner wall of a second composite cylindrical fuselage section in the plurality of composite cylindrical fuselage sections for the aircraft to form a joint. A load is applied to the joint during operation of the aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

FIG. 7 is an illustration of an exploded view of a portion of a fuselage in accordance with an advantageous embodiment;

FIG. 8 is an illustration of a flowchart of a process for operating an aircraft having bonded joints in accordance with an advantageous embodiment;

FIG. 10 is an illustration of a flowchart of a process for manufacturing a fuselage in accordance with an advantageous embodiment;

FIG. 11 is an illustration of a flowchart of a process for manufacturing a fuselage in accordance with an advantageous embodiment;

FIG. 13 is an illustration of a data processing system in accordance with an advantageous embodiment;

DETAILED DESCRIPTION

Figure 1:
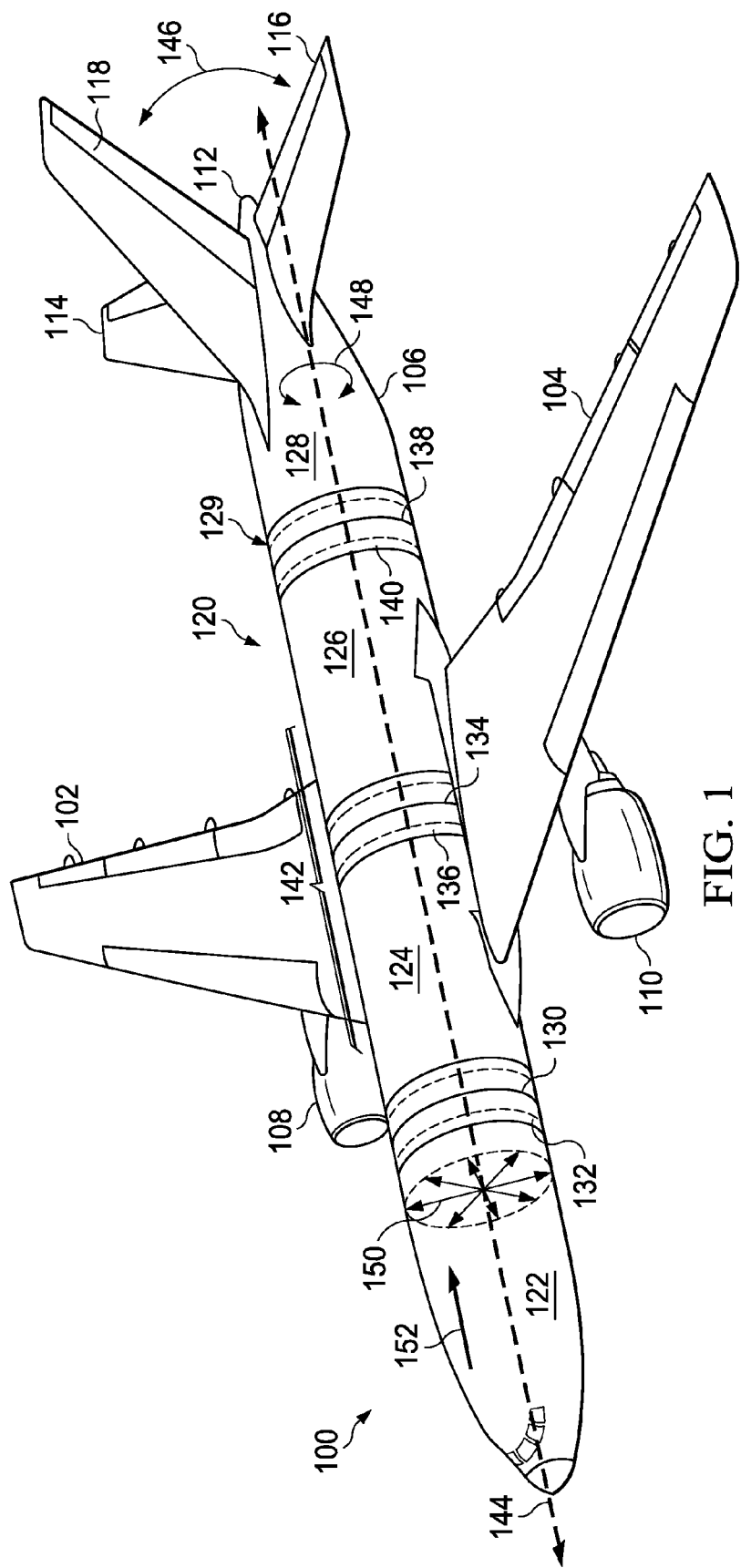
FIG. 1 is an illustration of an aircraft in accordance with an advantageous embodiment.

The different advantageous embodiments recognize and take into account one or more different considerations. For example, the different advantageous embodiments recognize and take into account that with the use of metallic fasteners, the weight of the aircraft may be more than desired. The different advantageous embodiments recognize and take into account that one manner in which weight may be reduced in an aircraft in which composite materials are used is to employ composite fasteners. Composite fasteners may result in a lower weight as compared to metallic fasteners. The different advantageous embodiments recognize and take into account, however, that the materials in composite fasteners have characteristics that are different from the metals used in metal fasteners. Those differences often result in redesigning of the fasteners to provide a desired performance when they are used in a joint where two composite fuselage sections are joined to each other.

The different advantageous embodiments also recognize and take into account that with fasteners, loads that are applied to the fuselage may travel to the fasteners. The different advantageous embodiments recognize and take into account that even with composite fasteners, the loads that can be applied to the joints may not be as great as desired. Further, the different advantageous embodiments also recognize and take into account that the installation of fasteners may take more time and cost more than desired.

The different advantageous embodiments also recognize and take into account that cylindrical fuselage sections of an aircraft are not required to have the same properties. For example, the different advantageous embodiments recognize and take into account that different loads may be applied to different cylindrical fuselage sections.

The different advantageous embodiments recognize and take into account that the loads may vary depending on the location of a cylindrical fuselage section in the fuselage of an aircraft. For example, the different advantageous embodiments recognize and take into account that if a lower load is expected to be applied to a first composite cylindrical fuselage section as compared to a second composite cylindrical fuselage section, the toughness of the first composite cylindrical fuselage section may be lower than the toughness of the second composite cylindrical fuselage section with both cylindrical fuselage sections providing a desired level of resistance to inconsistencies.

Thus, the different advantageous embodiments form joints between cylindrical fuselage sections of a fuselage that take the form of bonded joints. The different advantageous embodiments also may use cylindrical fuselage sections in which a cylindrical fuselage section may have different properties from another cylindrical fuselage section for the aircraft. In one advantageous embodiment, an apparatus comprises a composite section having a cylindrical shape and an outer wall configured to be bonded to a first inner wall of a first composite cylindrical fuselage section and a second inner wall of a second composite cylindrical fuselage section for an aircraft. The location of the connection between the first composite cylindrical fuselage section and the second composite cylindrical fuselage section is a joint. In these illustrative examples, the joint is a bonded joint.

With reference now to FIG. 1, an illustration of an aircraft is depicted in accordance with an advantageous embodiment. In this illustrative example, aircraft 100 is an example of an aircraft in which an advantageous embodiment may be implemented. More specifically, aircraft 100 is an example of one physical implementation for the aircraft illustrated in block form in FIG. 12.

As depicted in this figure, aircraft 100 has wing 102 and wing 104. These wings are attached to fuselage 106. Additionally, aircraft 100 also includes engine 108 and engine 110. Engine 108 is attached to wing 102, and engine 110 is attached to wing 104. Aircraft 100 also has tail section 112 with horizontal stabilizer 114, horizontal stabilizer 116, and vertical stabilizer 118.

In these illustrative examples, fuselage 106 is comprised of cylindrical fuselage sections 120. Cylindrical fuselage section 122, cylindrical fuselage section 124, cylindrical fuselage section 126, and cylindrical fuselage section 128 make up cylindrical fuselage sections 120 for fuselage 106. Cylindrical fuselage section 128 is the cylindrical fuselage section for tail section 112.

Figure 12:
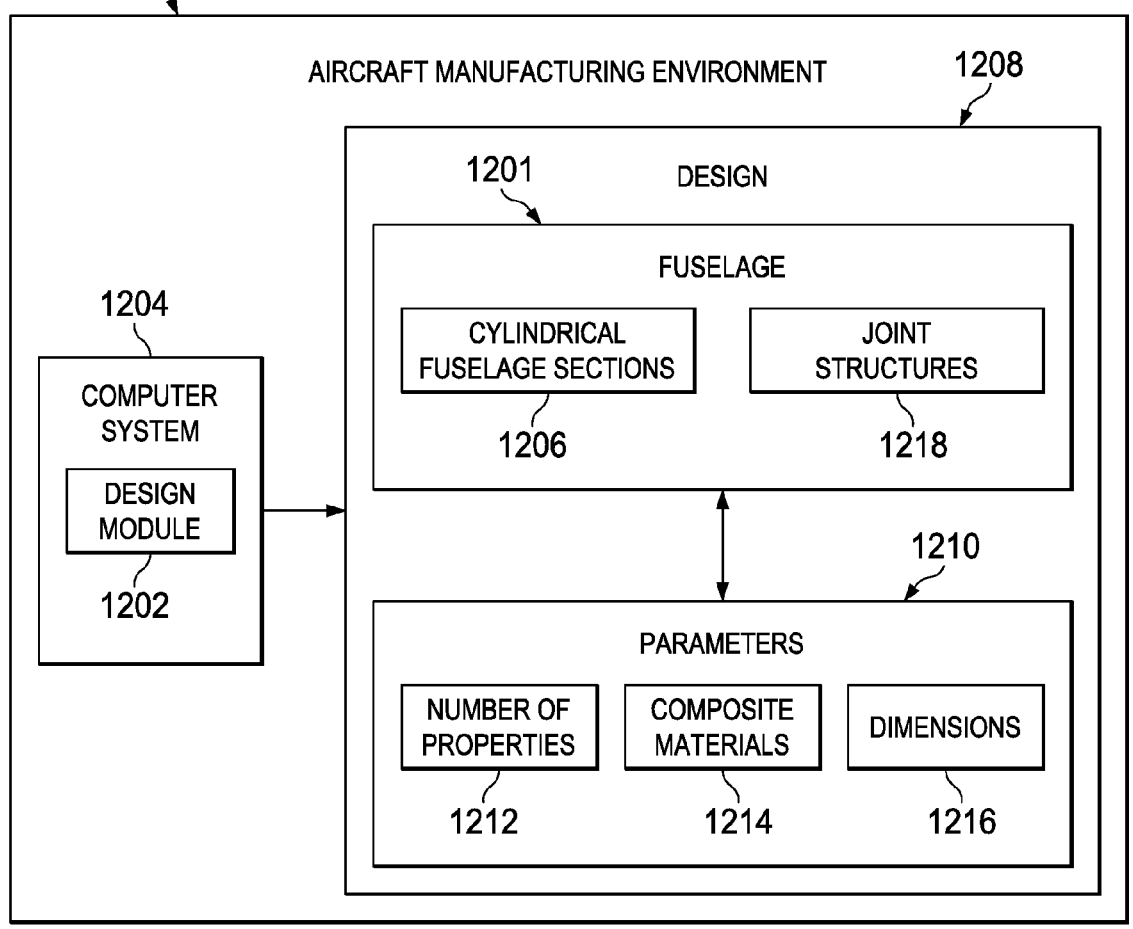
FIG. 12 is an illustration of an aircraft manufacturing environment in accordance with an advantageous embodiment.

Cylindrical fuselage sections 120 are examples of a physical implementation for cylindrical fuselage sections 1206 shown in block form in FIG. 12. In these depicted examples, a fuselage section is considered a cylindrical fuselage section even though the diameter of the fuselage section reduces in size. Examples are cylindrical fuselage section 122 and cylindrical fuselage section 128.

As illustrated, cylindrical fuselage sections 120 are connected to each other by joint structures 129. Cylindrical fuselage section 122 and cylindrical fuselage section 124 are connected to each other at joint 130 using joint structure 132 in joint structures 129. Cylindrical fuselage section 124 and cylindrical fuselage section 126 are connected to each other at joint 134 using joint structure 136 in joint structures 129. Cylindrical fuselage section 126 and cylindrical fuselage section 128 are connected to each other at joint 138 using joint structure 140 in joint structures 129. Joint structures 129 may be implemented using a joint structure, such as the joint structure shown in block form in FIG. 12.

As depicted, different cylindrical fuselage sections within cylindrical fuselage sections 120 may have different properties from each other or they all may have the same properties. These properties may include, for example, at least one of stiffness and fracture toughness.

In one illustrative example, cylindrical fuselage section 122 may have a toughness of about 2.0 inch-pounds per square inch. Cylindrical fuselage section 124 may have a toughness of about 3.0 inch-pounds per square inch, and cylindrical fuselage section 126 may have a toughness of about 4.0 inch-pounds per square inch. Cylindrical fuselage section 128 may have a toughness of about 5.0 inch-pounds per square inch. Of course, these properties listed for cylindrical fuselage sections 120 in fuselage 106 are only illustrations of some values for properties that may be used. Other implementations may employ other values or may use other properties instead of toughness. For example, cylindrical fuselage sections 120 may have properties based on stiffness instead of toughness, or both.

In these illustrative examples, cylindrical fuselage sections with a lower toughness may be manufactured such that those sections have less weight as compared to cylindrical fuselage sections with a higher toughness. For example, cylindrical fuselage section 122 may be lighter in weight than cylindrical fuselage sections 124, 126, and 128. In a similar fashion, cylindrical fuselage sections 124 and 126 may be lighter in weight than cylindrical fuselage section 128.

The cylindrical fuselage sections with a lighter weight and lower toughness, however, may provide the same resistance to inconsistencies as compared to the cylindrical fuselage sections with a heavier weight and higher toughness. In the different advantageous embodiments, a lower toughness, such as about 2.0 inch-pounds per square inch is used in cylindrical fuselage section 122 as compared to a higher toughness of about 3.0 inch-pounds per square inch as used in cylindrical fuselage section 124. Cylindrical fuselage section 122 may have a lower toughness based on a load that is expected to be applied to cylindrical fuselage section 122. If a lower load is expected to be applied to cylindrical fuselage section 122 as compared to cylindrical fuselage section 124, manufacturing cylindrical fuselage section 122 to have a higher level of toughness is unnecessary to reduce inconsistencies.

As a result, weight savings may occur based on manufacturing cylindrical fuselage section 122 with a lower toughness. Of course, although weight has been described with respect to different levels of toughness, weight savings also may occur based on other parameters depending on the particular implementation. With weight savings, increased fuel efficiency may occur.

In these illustrative examples, cylindrical fuselage sections 120 may be subject to loads applied about axis 144 extending through aircraft 100. Axis 144 may be a longitudinal axis extending centrally through cylindrical fuselage sections 120 in fuselage 106.

The loads may be, for example, without limitation, at least one of shear loads, bending loads, hoop loads, and other types of loads that may be applied to cylindrical fuselage sections 120. As depicted, bending load 146 and torsion load 148 are applied about axis 144. Bending load 146 may be applied by a load that bends cylindrical fuselage sections 120 longitudinally along axis 144. Torsion load 148 may be applied by a load that is rotational about axis 144 along the length of cylindrical fuselage sections 120.

Further, hoop load 150 and shear load 152 are applied to cylindrical fuselage sections 120. Hoop load 150 may be a load applied to the circumference of cylindrical fuselage sections 120 in a direction extending from axis 144 in an outward direction, inward direction, or a combination of the two. Hoop load 150 may occur from pressurization, depressurization and/or other sources on cylindrical fuselage sections 120 in fuselage 106. Shear load 152 may be a load applied to the surface of cylindrical fuselage sections 120, in which shear load 152 acts along and/or in a direction parallel to the surface of cylindrical fuselage sections 120.

Cylindrical fuselage sections 120 have a toughness that is sufficient to withstand bending load 146, torsion load 148, hoop load 150, shear load 152, and/or other types of loads that may be applied to cylindrical fuselage sections 120.

Figure 2:
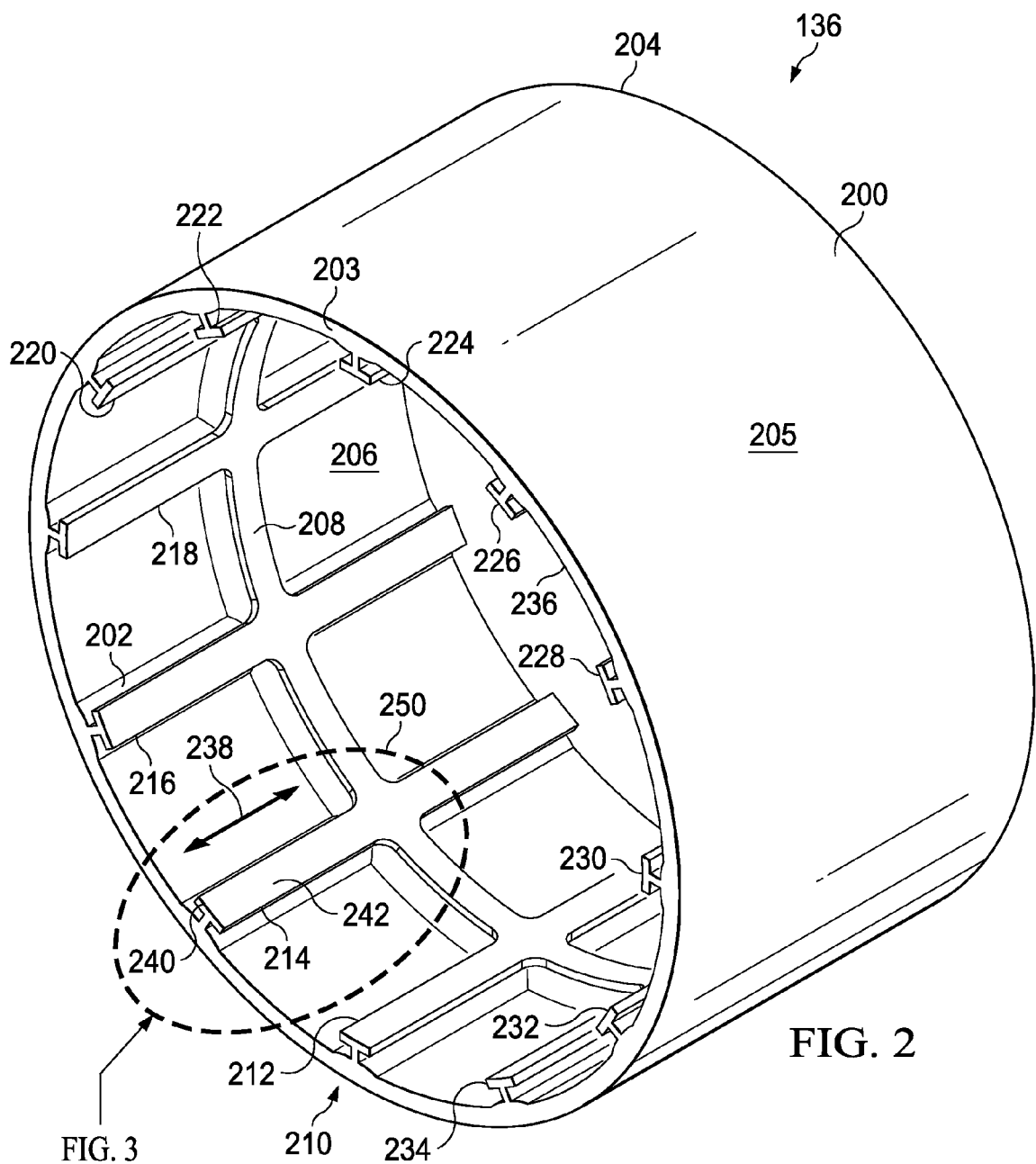
FIG. 2 is an illustration of a joint structure in accordance with an advantageous embodiment.

With reference now to FIG. 2, an illustration of a joint structure is depicted in accordance with an advantageous embodiment. In this illustrative example, a perspective view of joint structure 136 used in aircraft 100 in FIG. 1 is depicted in accordance with an advantageous embodiment. Joint structure 136 is an example of a physical implementation of the joint structure shown in block form in FIG. 12.

In this illustrative example, joint structure 136 comprises composite section 200 and reinforcing structure 202. Composite section 200 of joint structure 136 has end 203 and end 204. Composite section 200 comprises outer wall 205 and inner wall 206. Reinforcing structure 202 is located on inner wall 206. In these illustrative examples, reinforcing structure 202 is associated with inner wall 206.

The association is a physical association in these depicted examples. A first component, such as reinforcing structure 202, may be considered to be associated with a second component, such as inner wall 206, by being secured to the second component, bonded to the second component, mounted to the second component, fastened to the second component, and/or connected to the second component in some other suitable manner. The first component also may be connected to the second component using a third component. The first component may also be considered to be associated with the second component by being formed as part of and/or an extension of the second component.

Outer wall 205 is configured to be connected to the inner walls of two cylindrical fuselage sections. The connection is made by bonding outer wall 205 to the inner walls. This bonding is performed using adhesive in the depicted examples.

In these illustrative examples, reinforcing structure 202 is comprised of elongate structure 208 and number of elongate structures 210. As depicted, number of elongate structures 210 comprises elongate structures 212, 214, 216, 218, 220, 222, 224, 226, 228, 230, 232, and 234.

As illustrated, elongate structure 238 extends around circumference 236 of inner wall 206 in composite section 200. Number of elongate structures 210 extends in axial direction 239 of composite section 200 of joint structure 136. Axial direction 239 coincides with an axis extending through the cylindrical shape of composite section 200.

The ends of number of elongate structures 210 may be configured for connection to other structures. For example, end 240 of elongate structure 214 may be configured to be connected to a stringer on a fuselage, a rib, or other components. In another illustrative example, surface 242 may be connected to a stringer. Surface 242 may form a wall or one part of a stringer, depending on the particular implementation.

Elongate structure 208 extends substantially perpendicular from a surface of inner wall 206. Number of elongate structures 210 extends substantially perpendicular from the surface of inner wall 206. Number of elongate structures 210 extends from each side of elongate structure 208. In these illustrative examples, elongate structure 208 and number of elongate structures 210 have a cross section with a shape that is substantially an I-shape.

Figure 3:
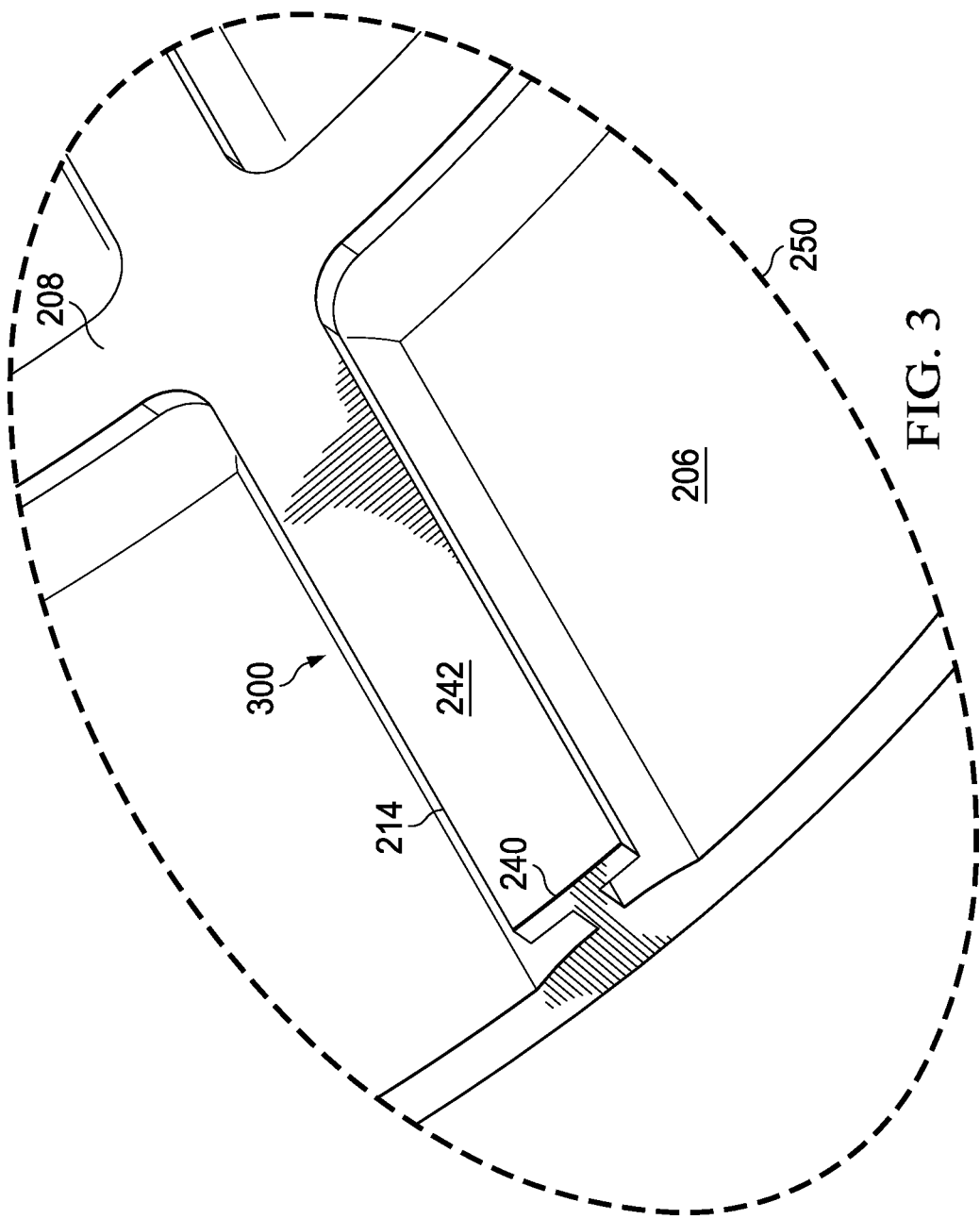
FIG. 3 is an illustration of a section of a joint structure in accordance with an advantageous embodiment.

With reference now to FIG. 3, an illustration of section 250 in FIG. 2 is depicted in accordance with an advantageous embodiment. In this illustrative example, a more detailed illustration of section 250 is depicted.

In this depicted example, elongate structure 214 can be seen in more detail. For example, I-shape 300 for elongate structure 214 is more clearly seen at end 240 of elongate structure 214. Of course, the cross-section for elongate structure 214 may have different shapes, depending on the particular implementation.

Figure 4:
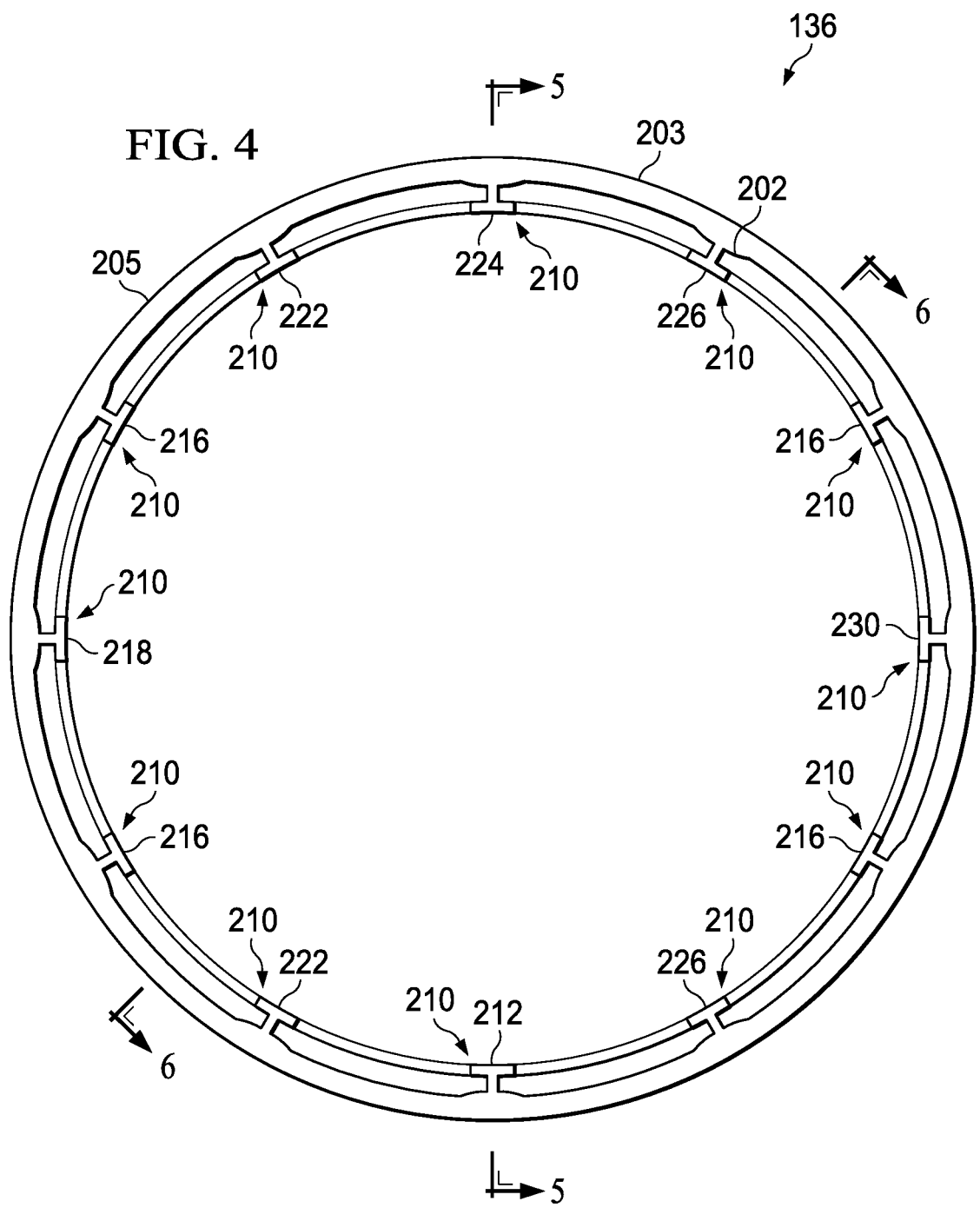
FIG. 4 is an illustration of a side view of a joint structure in accordance with an advantageous embodiment.

With reference next to FIG. 4, an illustration of a side view of a joint structure is depicted in accordance with an advantageous embodiment. As depicted, a side view of joint structure 136 in FIG. 1 is seen from end 203.

Figure 5:
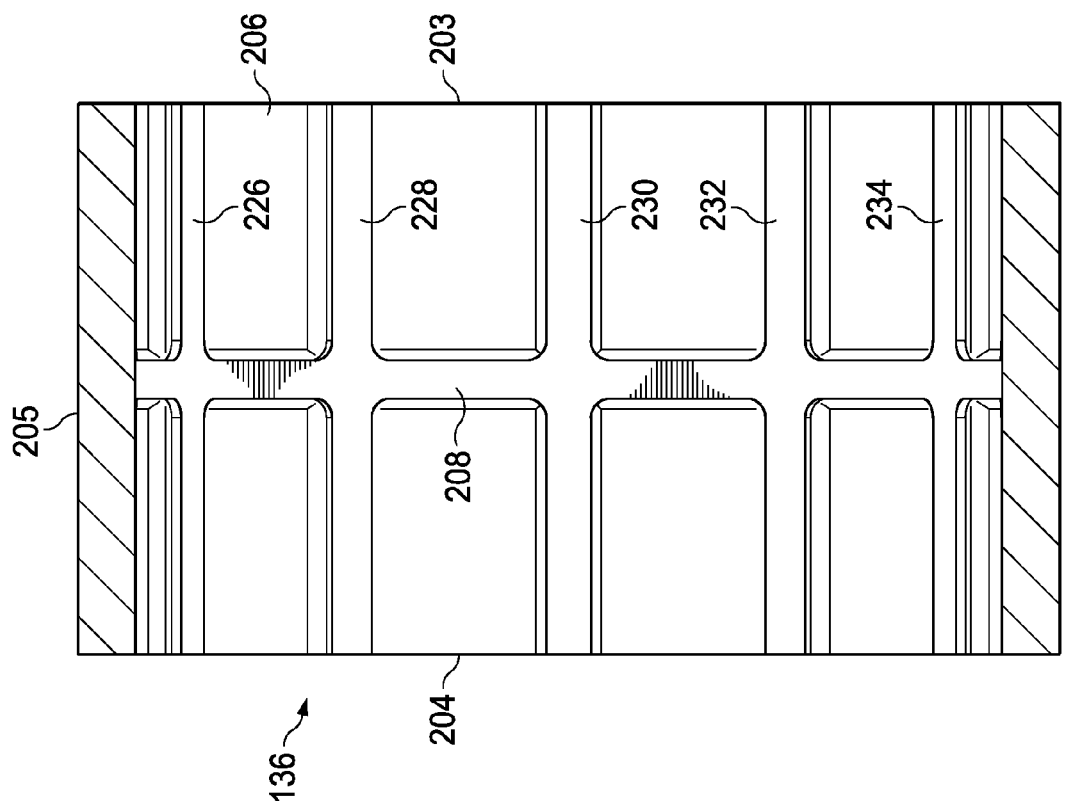
FIG. 5 is an illustration of a cross-sectional view of a joint structure in accordance with an advantageous embodiment.

With reference now to FIG. 5, an illustration of a cross-sectional view of a joint structure is depicted in accordance with an advantageous embodiment. In this figure, joint structure 136 is seen in a cross-sectional view taken along lines 5-5 in FIG. 4.

Figure 6:
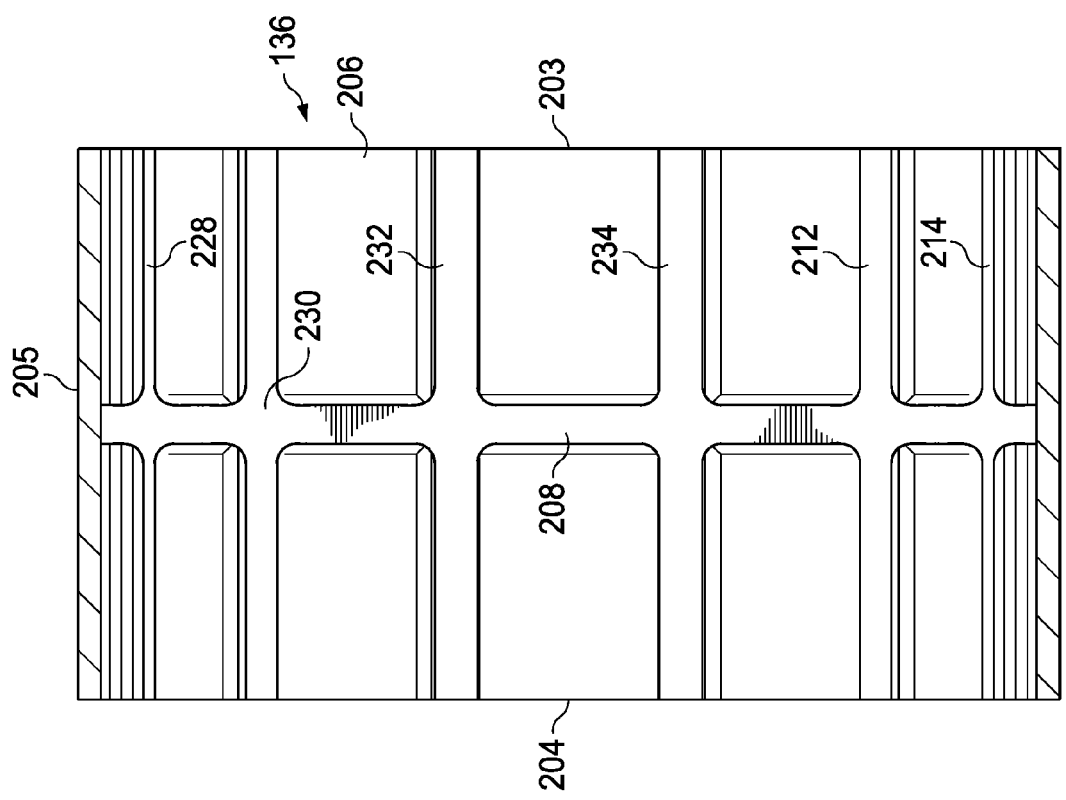
FIG. 6 is an illustration of a cross-sectional view of a joint structure in accordance with an advantageous embodiment.

In FIG. 6, an illustration of a cross-sectional view of a joint structure is depicted in accordance with an advantageous embodiment. As depicted, a cross-sectional view of joint structure 136 is seen as taken along lines 6-6 in FIG. 4.

Turning to FIG. 7, an illustration of an exploded view of a portion of a fuselage is depicted in accordance with an advantageous embodiment. In this illustrative example, a portion of fuselage 106 in section 142 in FIG. 1 is seen in an exploded view in this figure. As depicted, outer wall 205 of composite section 200 in joint structure 136 is bonded to inner wall 700 of cylindrical fuselage section 124 and inner wall 702 of cylindrical fuselage section 126 when these components are assembled.

With reference now to FIG. 8, an illustration of a flowchart of a process for operating an aircraft having bonded joints is depicted in accordance with an advantageous embodiment. The process illustrated in FIG. 8 may be implemented using the aircraft shown in block form in FIG. 12 in which joints are formed using joint structure 1226 and cylindrical fuselage sections 1206.

The process begins by operating an aircraft (operation 800). The operation of the aircraft may include various phases of flight. For example, the operation of the aircraft may be at least one of taxiing, takeoff, landing, ascent, descent, level flight, and other phases of flight. A load is applied to a joint having a joint structure, such as the joint structure (operation 802), with the process terminating thereafter. These different operations may be repeated until operation of the aircraft is complete.

Figure 9:
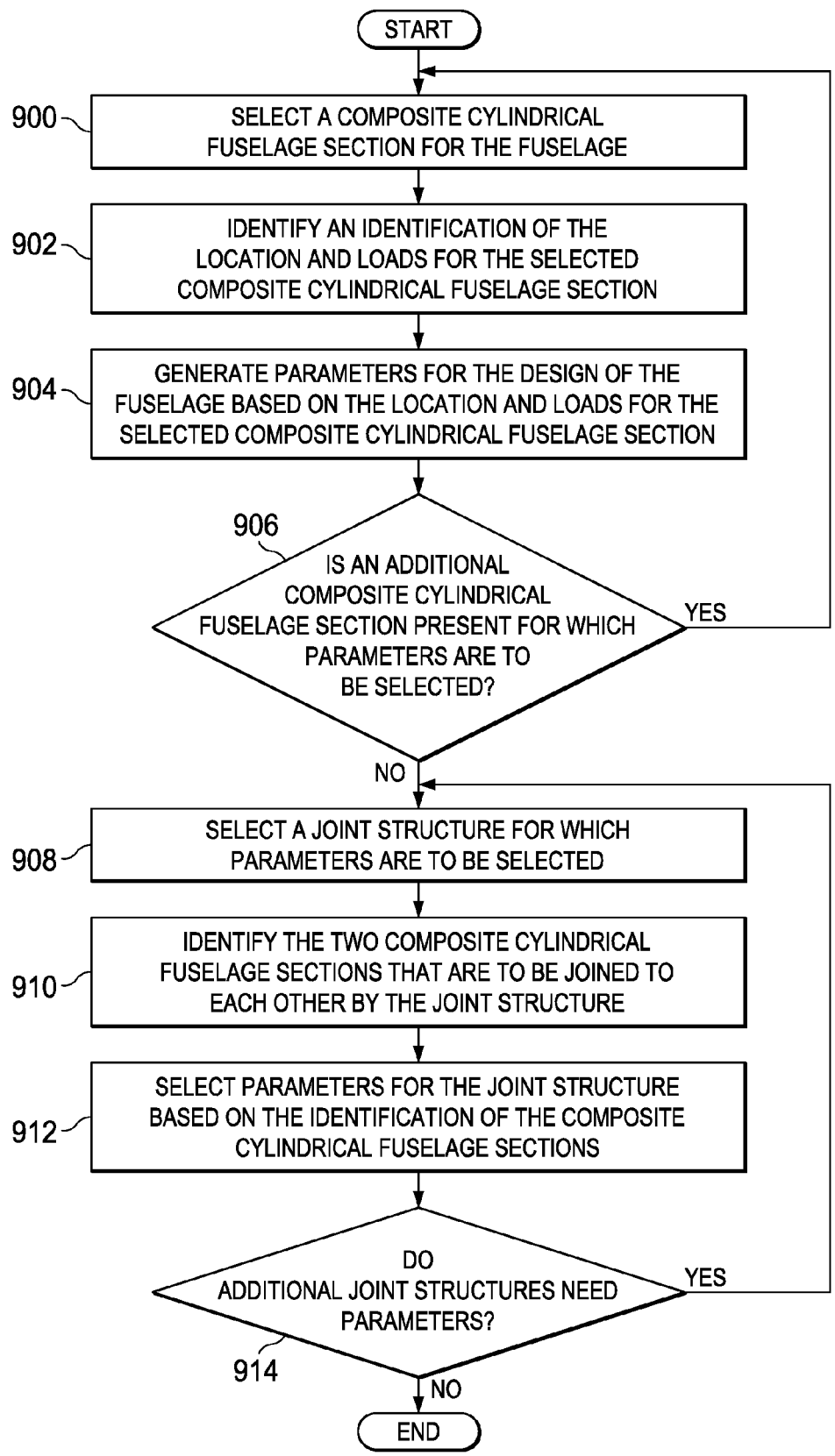
FIG. 9 is an illustration of a flowchart of a process for designing a fuselage for an aircraft in accordance with an advantageous embodiment.

With reference to FIG. 9, an illustration of a flowchart of a process for designing a fuselage for an aircraft is depicted in accordance with an advantageous embodiment. The process illustrated in FIG. 9 may be used to design fuselage 1201 shown in block form in FIG. 12. This process may be implemented in design module 1202 running on computer system 1204 shown in block form in FIG. 12.

The process begins by selecting a composite cylindrical fuselage section for the fuselage (operation 900). Thereafter, an identification of the location and loads for the selected composite cylindrical fuselage section is identified (operation 902). The process then generates parameters for the design of the fuselage based on the location and loads for the selected composite cylindrical fuselage section (operation 904).

A determination is made as to whether an additional composite cylindrical fuselage section is present for which parameters are to be selected (operation 906). If an additional composite cylindrical fuselage section is present, the process returns to operation 900. Otherwise, the process selects a joint structure for which parameters are to be selected (operation 908). The process identifies the two composite cylindrical fuselage sections that are to be joined to each other by the joint structure (operation 910). The process then selects parameters for the joint structure based on the identification of the composite cylindrical fuselage sections (operation 912). In operation 912, the selection of parameters may take into account factors, such as, for example, loads that are expected to be applied to the two composite cylindrical fuselage sections bonded to each other by the joint structure, loads that are expected to be applied to the joint structure, operating temperatures, and other suitable factors. A determination is made as to whether additional joint structures need parameters (operation 914). If additional joint structures are not present that need parameters, the process terminates. Otherwise, the process returns to operation 908.

Turning now to FIG. 10, an illustration of a flowchart of a process for manufacturing a fuselage is depicted in accordance with an advantageous embodiment. The process illustrated in FIG. 10 may be implemented to manufacture fuselage 1201 for the aircraft in aircraft manufacturing environment 1200 shown in block form in FIG. 12.

The process begins by positioning a first composite cylindrical fuselage section, a second composite cylindrical fuselage section, and a joint structure relative to each other (operation 1000). The process then bonds the joint structure to the interior walls of the first composite cylindrical fuselage section and the second composite cylindrical fuselage section (operation 1002), with the process terminating thereafter.

Operation 1002 may be performed in a number of different ways. For example, the joint structure may be pre-cured prior to positioning in operation 1000. Adhesive may be placed on the outer wall of the joint structure before or during positioning in operation 1000. Thereafter, the adhesive may be cured to form a bonded joint.

In another illustrative example, the joint structure may be layed up on the composite cylindrical fuselage sections or may be partially cured when positioned relative to the composite cylindrical fuselage sections. The joint structure may then be cured to bond these components to each other.

Turning now to FIG. 11, an illustration of a flowchart of a process for manufacturing a fuselage is depicted in accordance with an advantageous embodiment. The process illustrated in FIG. 11 may be implemented to manufacture fuselage 1201 for the aircraft in aircraft manufacturing environment 1200 shown in block form in FIG. 12.

The process begins by laying up composite materials for the first composite cylindrical fuselage section and the second composite cylindrical fuselage section (operation 1100). The process also lays up composite materials for the joint structure (operation 1102). The process then cures the first composite cylindrical fuselage section and the second composite cylindrical fuselage section and the joint structure (operation 1104), with the process terminating thereafter. The curing in operation 1104 bonds the joint structure to the composite cylindrical fuselage section to form a bonded joint.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1100 and operation 1102 in FIG. 11 may be performed in reverse order or concurrently. Further, other operations not shown may be included. For example, positioning of molds, laying up of fabric, tows, and other materials may occur even though not described in the flowcharts.

With reference now to FIG. 12, an illustration of an aircraft manufacturing environment is depicted in accordance with an advantageous embodiment. In this illustrative example, aircraft manufacturing environment 1200 may be used to manufacture fuselage 1201 for aircraft. In these illustrative examples, fuselage 1201 is comprised of cylindrical fuselage sections 1206. In the illustrative examples, cylindrical fuselage sections 1206 have a cylindrical shape. With the cylindrical shape, these fuselage sections have a cross section that may be a circle, an oval, egg shape, or some other type of closed curve. A fuselage section also may be constant or may taper in size in cylindrical fuselage sections 1206. For example, cylindrical fuselage sections 1206 may have a cross section that reduces the size of part or all of the length of the fuselage section. For example, when the fuselage section has a cross section with a shape of a circle, the diameter of the circle may reduce in size along at least a portion of the length of the fuselage section.

Cylindrical fuselage sections 1206 are composite cylindrical fuselage sections manufactured from composite materials 1214. Additionally, in some illustrative examples, the composite cylindrical fuselage sections also may include metal in addition to composite materials 1214. In these illustrative examples, cylindrical fuselage sections 1206 have number of properties 1212. Number of properties 1212 may take the form of structural properties. For example, number of properties 1212 may include at least one of toughness, stiffness, and other suitable properties. As used herein, the phrase "at least one of", when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

Number of properties 1212 may differ between different cylindrical fuselage sections in cylindrical fuselage sections 1206. Number of properties 1212 may be selected to contain undesired inconsistencies that may occur when cylindrical fuselage sections 1206 encounter loads during operation of aircraft.

For example, cylindrical fuselage sections 1206 may include a first composite cylindrical fuselage section and a second composite cylindrical fuselage section. The first composite cylindrical fuselage section has a first number of properties in number of properties 1212, and the second composite cylindrical fuselage section has a second number of properties in number of properties 1212. The first number of properties may be different from the second number of properties.

For example, depending on the loads expected to be encountered by the first composite cylindrical fuselage section and the second composite cylindrical fuselage section, the toughness and stiffness in the first number of properties for the first composite cylindrical fuselage section may be different from the second number of properties for the second composite cylindrical fuselage section. These loads may take different forms. For example, the loads may be at least one of shear loads, bending loads, and other types of loads that may be applied to cylindrical fuselage sections 1206 in fuselage 1201.

In these illustrative examples, the first composite cylindrical fuselage section and the second composite cylindrical fuselage section may be joined to each other at a joint. In these illustrative examples, the joint takes the form of a bonded joint. The bonded joint is formed using a joint structure. The joint structure is located on the interior of aircraft and connects two of cylindrical fuselage sections 1206 to each other. The joint structure may be, for example, without limitation, a stepped joint.

In these illustrative examples, the joint structure comprises a composite section. The composite section takes the form of a cylindrical section. The cylindrical section may be substantially in the shape of a hollow cylinder in these illustrative examples. An outer wall of the cylindrical section is configured to be bonded to a first inner wall of the first composite cylindrical fuselage section and a second inner wall of the second composite cylindrical fuselage section for aircraft.

Additionally, the joint structure also may include a reinforcing structure. The reinforcing structure is associated with an inner wall of a cylindrical section. The reinforcing structure is configured to increase a load that can be carried by the joint at a location where the first composite cylindrical fuselage section is joined to the second composite cylindrical fuselage section using the joint.

The reinforcing structure may include an elongate structure. The elongate structure extends substantially perpendicular from a surface of the inner wall of the reinforcing structure. The elongate structure may extend around a circumference for the inner wall of the composite section.

Additionally, the reinforcing structure also may include a number of elongate structures. The number of elongate structures may be used in addition to and/or in place of the elongate structure. The number of elongate structures extends substantially perpendicular from the surface of the inner wall of the composite section. The number of elongate structures extends in an axial direction of the composite section. The axial direction may be a direction along an axis extending centrally through the cylindrical section.

The number of elongate structures may be used with the elongate structure. With this configuration, the number of elongate structures may extend from the elongate structure at a direction substantially perpendicular to a side of the elongate structure in the axial direction of the composite section.

In these illustrative examples, the elongate structure and the number of elongate structures may take the form of flanges. A flange in the flanges may have various cross-sectional shapes. For example, a flange may have a rectangular shape, a square shape, an I-shape, a T-shape, and/or other suitable shapes.

As depicted, the outer wall of the composite section is bonded to the first inner wall of the first composite cylindrical fuselage section and the second inner wall of the second composite cylindrical fuselage section using adhesive.

In these illustrative examples, the design of cylindrical fuselage sections 1206 and joint structures 1218, such as the joint structure, may be performed using design module 1202 running on computer system 1204. Design module 1202 may be software, hardware, or a combination of the two. Computer system 1204 is one or more computers. When more than one computer is present in computer system 1204, those computers may be in communication with each other using a medium, such as a network.

Design module 1202 may be used to generate design 166. Design 1208 may include parameters 1210. Parameters 1210 may specify items, such as dimensions 1216 for cylindrical fuselage sections 1206, composite materials used in cylindrical fuselage sections 1206, and number of properties 1212 for cylindrical fuselage sections 1206.

The selection of parameters 1210 may vary for each cylindrical fuselage section within cylindrical fuselage sections 1206, depending on at least one of a selected location in fuselage 1201 for the cylindrical fuselage section, a load to be applied to the cylindrical fuselage section, and other factors.

The selection of parameters 1210 may be made such that cylindrical fuselage sections in cylindrical fuselage sections 1206 can each support the application of a desired load. In these illustrative examples, the desired load may be, for example, without limitation, about 150 percent of the load that is expected to be applied to the cylindrical fuselage section in cylindrical fuselage sections 1206.

The load expected to be applied may be a limit load. A limit load is a load that a cylindrical fuselage section is expected to encounter once within the lifetime of cylindrical fuselage sections 1206.

In selecting parameters 1210 to take in to account different locations in a particular cylindrical fuselage section, parameters 1210 may be used to obtain different properties for number of properties 1212 for different cylindrical fuselage sections in cylindrical fuselage sections 1206. For example, different cylindrical fuselage sections may have different levels of toughness. As an example, parameters 1210 may include materials and layups for layers that form cylindrical fuselage sections 1206. Parameters 1210 may specify a desired level of toughness for those layers.

Design module 1202 may be used to select different amounts of toughness for different cylindrical fuselage sections in cylindrical fuselage sections 1206. For example, the first number of properties for the first composite cylindrical fuselage section may have a higher level of toughness than the second number of properties for the second composite cylindrical fuselage section.

With the selection of toughness, each cylindrical fuselage section in the first composite cylindrical fuselage section may be designed for the particular loads that may be applied to that particular cylindrical fuselage section. As a result, a reduction in inconsistencies may occur. This reduction in inconsistencies may be a reduction in the occurrence of the inconsistencies, the size of the inconsistencies that may occur, the spreading of the inconsistencies, and other reductions in the inconsistencies.

For example, reduction in the inconsistencies in the form of delamination, cracks, openings, or other undesired inconsistencies may result from designing each cylindrical fuselage section to have a toughness based on loads that are expected to be applied to that particular cylindrical fuselage section.

In particular, the toughness for each cylindrical fuselage section may be selected such that the cylindrical fuselage section meets requirements. These requirements may be those from the manufacturer, a governmental agency, or some other suitable source. These requirements may be, for example, airworthiness from the Federal Aviation Administration.

Further, weight savings may occur from individually designing number of properties 1212 for each cylindrical fuselage section in cylindrical fuselage sections 1206. For example, if the first composite cylindrical fuselage section is expected to have a lower load applied to it as compared to the second composite cylindrical fuselage section, the toughness in the first number of properties for the first composite cylindrical fuselage section may be less than the toughness in the second number of properties for the second composite cylindrical fuselage section. This lower toughness may result in less weight for the first composite cylindrical fuselage section, while maintaining a desired level of load bearing capacity for this cylindrical fuselage section.

Parameters 1210 also may include parameters for the joint structure. These parameters may include, for example, without limitation, at least one of dimensions, materials, and other suitable parameters. Parameters 1210 for the joint structure also may include similar parameters such as those for the toughness of the joint structure.

The illustration of fuselage 1201 in FIG. 12 in which cylindrical fuselage sections 1206 are connected to each other using the joint structure is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, although the illustrative examples have been described with respect to aircraft, an advantageous embodiment may be applied to other types of structures, such as a hull or fuselage for a spacecraft, a submarine, or some other suitable type of platform. As another illustrative example, depending on the particular implementation, the joint structure may be supplemented through the use of composite fasteners, metallic fasteners, or other types of fastening systems.

Also, the first composite cylindrical fuselage section may be bonded directly to the second composite cylindrical fuselage section by the adhesive in addition to using the joint structure. Further, although the different illustrative examples are described with respect to cylindrical fuselage sections that may have different properties, in some advantageous embodiments all of cylindrical fuselage sections 1206 may have substantially the same number of properties 1212.

As another illustrative example, although toughness has been described as one parameter in parameters 1210, other parameters also may be considered by design module 1202 in generating design 1208. For example, stiffness is another parameter that may be considered in generating design 1208. Of course, other parameters also may be considered in addition to and/or in place of toughness and stiffness in design 1208.

The different components shown in FIGS. 1-7 may be combined with components in FIG. 12, used with components in FIG. 12, or a combination of the two. Additionally, some of the components in FIGS. 1-7 may be illustrative examples of how components shown in block form in FIG. 12 can be implemented as physical structures.

Turning now to FIG. 13, an illustration of a data processing system is depicted in accordance with an advantageous embodiment. Data processing system 1300 may be used to implement one or more computers in computer system 1204 shown in block form in FIG. 12. In this illustrative example, data processing system 1300 includes communications framework 1302, which provides communications between processor unit 1304, memory 1306, persistent storage 1308, communications unit 1310, input/output (I/O) unit 1312, and display 1314.

Processor unit 1304 serves to execute instructions for software that may be loaded into memory 1306. Processor unit 1304 may be a number of processors, a multi-processor core, or some other type of processor, depending on the particular implementation. A number, as used herein with reference to an item, means one or more items. Further, processor unit 1304 may be implemented using a number of heterogeneous processor systems in which a main processor is present with secondary processors on a single chip. As another illustrative example, processor unit 1304 may be a symmetric multi-processor system containing multiple processors of the same type.

Memory 1306 and persistent storage 1308 are examples of storage devices 1316. A storage device is any piece of hardware that is capable of storing information, such as, for example, without limitation, data, program code in functional form, and/or other suitable information either on a temporary basis and/or a permanent basis. Storage devices 1316 may also be referred to as computer readable storage devices in these illustrative examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these illustrative examples, provides for communications with other data processing systems or devices. In these illustrative examples, communications unit 1310 is a network interface card. Communications unit 1310 may provide communications through the use of either or both physical and wireless communications links.

Input/output unit 1312 allows for input and output of data with other devices that may be connected to data processing system 1300. For example, input/output unit 1312 may provide a connection for user input through a keyboard, a mouse, and/or some other suitable input device. Further, input/output unit 1312 may send output to a printer. Display 1314 provides a mechanism to display information to a user.

Instructions for the operating system, applications, and/or programs may be located in storage devices 1316, which are in communication with processor unit 1304 through communications framework 1302. In these illustrative examples, the instructions are in a functional form on persistent storage 1308. These instructions may be loaded into memory 1306 for execution by processor unit 1304. The processes of the different embodiments may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these illustrative examples. In one example, computer readable media 1320 may be computer readable storage media 1324 or computer readable signal media 1326.

Computer readable storage media 1324 may include, for example, an optical or magnetic disk that is inserted or placed into a drive or other device that is part of persistent storage 1308 for transfer onto a storage device, such as a hard drive, that is part of persistent storage 1308. Computer readable storage media 1324 also may take the form of a persistent storage, such as a hard drive, a thumb drive, or a flash memory, that is connected to data processing system 1300. In some instances, computer readable storage media 1324 may not be removable from data processing system 1300.

In these illustrative examples, computer readable storage media 1324 is a physical or tangible storage device used to store program code 1318 rather than a medium that propagates or transmits program code 1318. Computer readable storage media 1324 is also referred to as a computer readable tangible storage device or a computer readable physical storage device. In other words, computer readable storage media 1324 is a media that can be touched by a person.

Alternatively, program code 1318 may be transferred to data processing system 1300 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link.

In other words, the communications link and/or the connection may be physical or wireless in the illustrative examples.

In some advantageous embodiments, program code 1318 may be downloaded over a network to persistent storage 1308 from another device or data processing system through computer readable signal media 1326 for use within data processing system 1300. For instance, a program code stored in a computer readable storage medium in a server data processing system may be downloaded over a network from the server to data processing system 1300. The data processing system providing program code 1318 may be a server computer, a client computer, or some other device capable of storing and transmitting program code 1318.

The different components illustrated for data processing system 1300 are not meant to provide architectural limitations to the manner in which different embodiments may be implemented. The different advantageous embodiments may be implemented in a data processing system including components in addition to and/or in place of those illustrated for data processing system 1300. Other components shown in FIG. 13 can be varied from the illustrative examples shown. The different embodiments may be implemented using any hardware device or system capable of running program code 1318. As one example, the data processing system may include organic components integrated with inorganic components and/or may be comprised entirely of organic components excluding a human being. For example, a storage device may be comprised of an organic semiconductor.

In another illustrative example, processor unit 1304 may take the form of a hardware unit that has circuits that are manufactured or configured for a particular use. This type of hardware may perform operations without needing a program code to be loaded into a memory from a storage device to be configured to perform the operations.

For example, when processor unit 1304 takes the form of a hardware unit, processor unit 1304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1318 may be omitted because the processes for the different embodiments are implemented in a hardware unit.

In still another illustrative example, processor unit 1304 may be implemented using a combination of processors found in computers and hardware units. Processor unit 1304 may have a number of hardware units and a number of processors that are configured to run program code 1318. With this depicted example, some of the processes may be implemented in the number of hardware units, while other processes may be implemented in the number of processors.

In another example, a bus system may be used to implement communications framework 1302 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1306 or a cache, such as found in an interface and memory controller hub that may be present in communications framework 1302.

Figure 14:
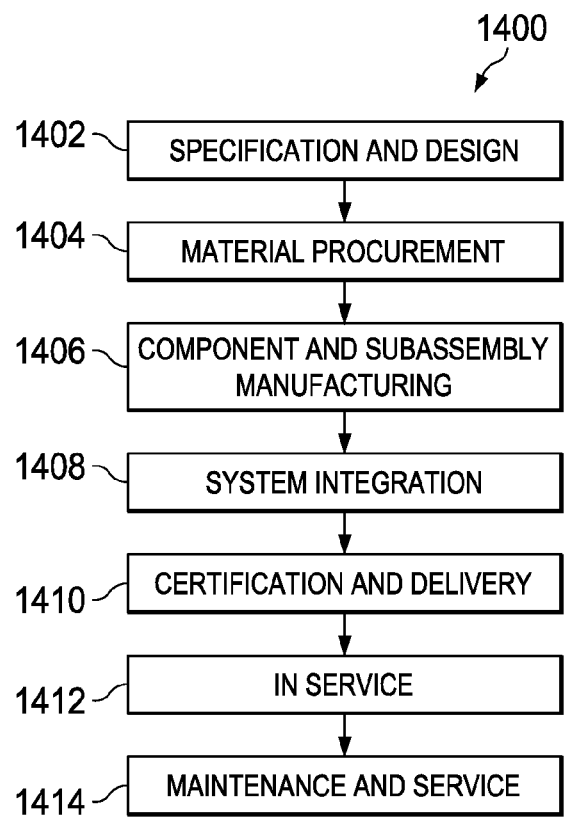
FIG. 14 is an illustration of an aircraft manufacturing and service method in accordance with an advantageous embodiment.
Figure 15:
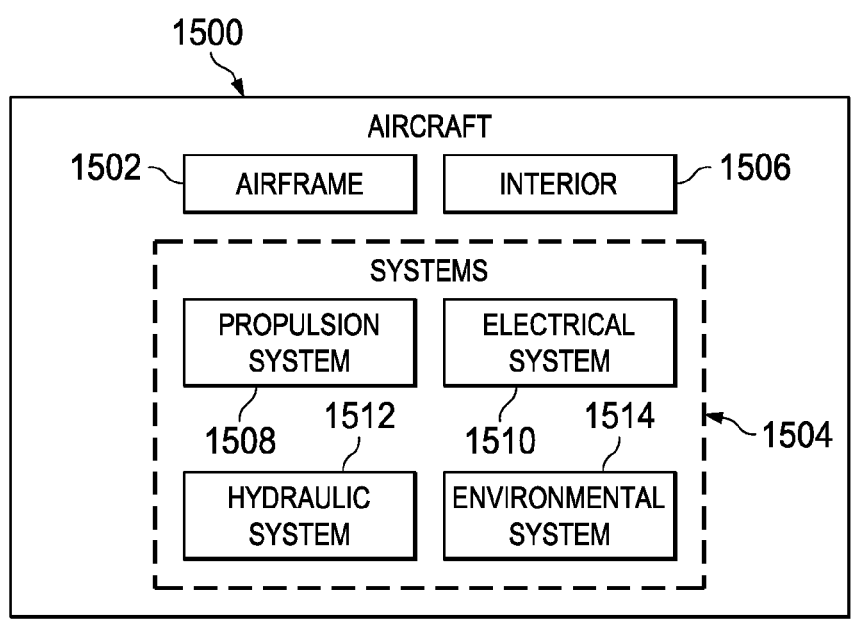
FIG. 15 is an illustration of an aircraft in which an advantageous embodiment may be implemented.

Advantageous embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an advantageous embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these illustrative examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an advantageous embodiment may be implemented. In this illustrative example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 1400 in FIG. 14.

In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14.

For example, the joint structure shown in block form in FIG. 12 may be fabricated during component and subassembly manufacturing 1406 or during system integration 1408 of aircraft 1500. The joint structure may be used during refurbishment of aircraft 1500. Metallic fasteners may be removed and replaced with the joint structure. The use of a number of the different advantageous embodiments may substantially expedite the assembly of and/or reduce the cost of aircraft 1500.

Thus, the different advantageous embodiments provide a fuselage design that may provide a desired level of resistance to inconsistencies. Further, when using different properties for different cylindrical fuselage sections, weight savings also may occur. Further, weight savings may result from using the joint structure instead of metallic fasteners.

With one or more of the different advantageous embodiments, the reduction in fasteners may increase fuel savings from about 50 percent to about 60 percent. Further, corrosion resistance products and materials may be unnecessary or reduced with the reduction in the use of metal fasteners. Also, with the use of the joint structure to the form bonded joint, the manufacturing of an aircraft may occur more quickly because of the reduction in the number of parts to be assembled or installed.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
 a composite section comprising a cylindrical shape and an outer wall bonded to a first inner wall of a first composite cylindrical fuselage section and a second inner wall of a second composite cylindrical fuselage section of a fixed wing aircraft; and
 a reinforcing structure associated with the inner wall of the composite section, the reinforcing structure comprising a first elongate structure extending substantially perpendicular from a surface of the inner wall of the composite section and extending around a circumference for the inner wall of the composite section and a second elongate structure extending in an axial direction of the composite section, wherein the reinforcing structure increases a load capability of a joint formed at a location in which the first composite cylindrical fuselage section and the second composite cylindrical fuselage section are joined, the composite section and the reinforcing structure being bonded to the first inner wall for the first composite cylindrical fuselage section and the second inner wall of the second composite cylindrical fuselage section to form a bonded joint for the aircraft.

2. The apparatus of claim 1, wherein the reinforcing structure further comprises:
 a number of elongate structures extending substantially perpendicular from the surface of the inner wall of the composite section and extending from the first elongate structure in a direction substantially perpendicular to a side of the first elongate structure in the axial direction of the composite section.

3. The apparatus of claim 2, wherein the first elongate structure and the number of elongate structures are flanges.

4. The apparatus of claim 2, wherein the number of elongate structures is a number of flanges in which a flange in the number of flanges has an I-shape.

5. The apparatus of claim 1, wherein the first composite cylindrical fuselage section has a number of different properties from the second composite cylindrical fuselage section.

6. The apparatus of claim 5, wherein the number of different properties comprises a first toughness and stiffness associated with the first composite cylindrical fuselage and a second toughness and stiffness associated with the first composite cylindrical fuselage, the first toughness and stiffness different from the second toughness and stiffness.

7. The apparatus of claim 5, wherein a property in the number of different properties for the first composite cylindrical fuselage section is selected based on a location of the first composite cylindrical fuselage section in a fuselage of the aircraft.

8. The apparatus of claim 5, wherein a property in the number of different properties for the first composite cylindrical fuselage section is selected based on a load expected to be applied to the first composite cylindrical fuselage section.

9. A fixed wing aircraft comprising:
- a plurality of composite cylindrical fuselage sections, wherein a first composite cylindrical fuselage section in the plurality of composite cylindrical fuselage sections has a number of different properties from a second composite cylindrical fuselage section in the plurality of composite cylindrical fuselage sections;
- a number of joint structures bonded to the plurality of composite cylindrical fuselage sections to connect the plurality of composite cylindrical fuselage sections to each other, such that a joint structure in the number of joint structures comprises a composite section and a reinforcing structure, the composite section having a cylindrical shape and an outer wall configured to be bonded to a first inner wall of the first composite cylindrical fuselage section in the plurality of composite cylindrical fuselage sections and a second inner wall of the second composite cylindrical fuselage section in the plurality of composite cylindrical fuselage sections for the aircraft; and
- the reinforcing structure associated with an inner wall of the composite section, the reinforcing structure comprising a first elongate structure extending substantially perpendicular from a surface of the inner wall of the composite section and extending around a circumference for the inner wall of the composite section and a second elongate structure extending in an axial direction of the composite section, such that the reinforcing structure increases a load capability of a joint formed at a location in which the first composite cylindrical fuselage section and the second composite cylindrical fuselage section are joined, such that the composite section and the reinforcing structure bonded to the first inner wall for the first composite cylindrical fuselage section and the second inner wall of the second composite cylindrical fuselage section form a bonded joint for the aircraft.

10. The aircraft of claim 9, wherein the number of different properties comprises at least one of toughness and stiffness.

11. The aircraft of claim 9, wherein a property in the number of different properties for the first composite cylindrical fuselage section is selected based on a selected location of the first composite cylindrical fuselage section in a fuselage of the aircraft.

12. The aircraft of claim 9, wherein a property in the number of different properties for the first composite cylindrical fuselage section is selected based on the load expected to be applied to the first composite cylindrical fuselage section.

13. A method for applying a load to an aircraft, the method comprising:
- operating the aircraft having a plurality of composite cylindrical fuselage sections and a number of joint structures bonded to the plurality of composite cylindrical fuselage sections connecting the plurality of composite cylindrical fuselage sections to each other;
- bonding a joint structure, comprising a composite section having a cylindrical shape and an outer wall, in the number of joint structures, to a first inner wall of a first composite cylindrical fuselage section in the plurality of composite cylindrical fuselage sections and a second inner wall of a second composite cylindrical fuselage section in the plurality of composite cylindrical fuselage sections to form a joint in the aircraft;
- physically associating a reinforcing structure with the inner wall of the composite section, the reinforcing structure comprising a first elongate structure extending substantially perpendicular from a surface of the inner wall of the composite section and extending around a circumference for the inner wall of the composite section and a second elongate structure extending in an axial direction of the composite section, such that the reinforcing structure increases a load capability of the joint formed at a location in which the first composite cylindrical fuselage section and the second composite cylindrical fuselage section are joined, such that the composite section and the reinforcing structure are bonded to the first inner wall for the first composite cylindrical fuselage section and the second inner wall of the second composite cylindrical fuselage section to form a bonded joint for the aircraft; and
- applying the load to the joint during operation of the aircraft.

\* \* \* \* \*